US007663796B2

(12) United States Patent
Lee (10) Patent No.: US 7,663,796 B2
(45) Date of Patent: Feb. 16, 2010

(54) ELECTRIC-FIELD-DRIVING REFLECTIVE DISPLAY APPARATUS (75) Inventor: Chun-Hyuk Lee, Seoul (KR)

(73) Assignee: Dongjin Semichem Co.,Ltd., Incheon (KR)

( * ) Notice: Subject to any disclaimer, the term of this patent is extended or adjusted under 35 U.S.C. 154(b) by 154 days.

(21) Appl. No.: 11/909,743

(22) PCT Filed: Apr. 5, 2006

(86) PCT No.: PCT/KR2006/001255

§ 371 (c)(1),
(2), (4) Date: Sep. 26, 2007

(87) PCT Pub. No.: WO2006/107174

PCT Pub. Date: Oct. 12, 2006

(65) Prior Publication Data
US 2008/0304129 A1 Dec. 11, 2008

(30) Foreign Application Priority Data
Apr. 8, 2005 (KR) .................. 10-2005-0029338

(51) Int. Cl.
G02B 1/07 (2006.01)
(52) U.S. Cl. .................. 359/259; 359/296; 345/92
(58) Field of Classification Search .............. 359/296, 359/290, 259; 345/92, 98, 107
See application file for complete search history.

(56) References Cited

U.S. PATENT DOCUMENTS

| 6,800,369 | B2 * | 10/2004 | Gimzewski et al. | 428/408 |
|---|---|---|---|---|
| 6,865,012 | B2 * | 3/2005 | Liang et al. | 359/296 |
| 7,038,670 | B2 * | 5/2006 | Liang et al. | 345/204 |
| 7,126,577 | B2 * | 10/2006 | Zhou et al. | 345/107 |
| 7,271,947 | B2 * | 9/2007 | Liang et al. | 359/296 |
| 2002/0190936 | A1 | 12/2002 | Darty | |
| 2004/0085285 | A1 * | 5/2004 | Ahn et al. | 345/107 |
| 2005/0001963 | A1 | 1/2005 | Yokoyama | |
| 2005/0042392 | A1 | 2/2005 | Miller et al. | |

FOREIGN PATENT DOCUMENTS

| EP | 1 482 354 A | 12/2004 |
|---|---|---|
| EP | 1 482 354 A1 | 12/2004 |
| JP | 2002/131741 | 5/2002 |

(Continued)

OTHER PUBLICATIONS

International Search Report dated Sep. 28, 2007. PCT/KR2006/001255.

(Continued)

Primary Examiner—Timothy J Thompson
(74) Attorney, Agent, or Firm—Gifford, Krass, Sprinkle, Anderson & Citkowski, P.C.

(57) ABSTRACT

An electric-field-driving reflective display apparatus is provided. The electric-field-driving reflective display apparatus includes a barrier wall which has a plurality of driving grooves and first and second surfaces, a reflecting member which is disposed within the driving groove and has an electric charge, a first electrode which is disposed on the first surface of the barrier wall, and a second electrode which is disposed on the second surface of the barrier wall, wherein areas of cross sections of each driving groove parallel to the first and second surface are equal to each other.

24 Claims, 4 Drawing Sheets

FOREIGN PATENT DOCUMENTS

| | | | |
|---|---|---|---|
| JP | 2002/359068 | | 12/2002 |
| JP | 2005-49657 | * | 2/2005 |
| WO | WO-02/01281 A | | 1/2002 |
| WO | WO-02/01281 A2 | | 1/2002 |
| WO | WO-02/091070 | | 11/2002 |
| WO | WO-2004/015491 A1 | | 2/2004 |

OTHER PUBLICATIONS

European Search Report dated Jun. 3, 2009. EP 06 73 2816.

* cited by examiner

ELECTRIC-FIELD-DRIVING REFLECTIVE DISPLAY APPARATUS

TECHNICAL FIELD

The present invention relates to a flat display apparatus, and more particularly, to an electric-field-driving reflective display apparatus.

BACKGROUND ART

In conventional flat display apparatuses, there are a liquid crystal display (LCD) apparatus, a plasma display panel (PDP) apparatus, an organic light emitting display (OLED) apparatus, a field effect display (FED) apparatus, an electrophoretic display apparatus, and the like. The liquid crystal display (LCD) apparatus is widely used for a monitor and a television set. The plasma display panel (PDP) apparatus is widely used for a large-sized television set. The organic light emitting display (OLED) apparatus which is used for a screen of a mobile phone has been actively researched and developed for applications of a medium or large sized display apparatus. In addition, the field effect display (FED) apparatus and electrophoretic display apparatus has been researched and developed for applications of a monitor, a television set, or an electronic paper.

DISCLOSURE OF INVENTION

Technical Problem

These conventional display apparatuses have their own shortcomings. For example, the liquid crystal display apparatus has shortcomings of a narrow viewing angle and a high production cost. The plasma display panel apparatus has shortcomings of a difficulty in reducing pixel size below a specific size, high power combustion, and large heat releasing.

Technical Solution

The present invention provides a noble flat display apparatus capable of removing shortcomings of conventional flat display apparatuses.

According to an aspect of the present invention, there is provided an electric-field-driving reflective display apparatus comprising: a barrier wall which has a plurality of driving grooves and first and second surfaces; a reflecting member which is disposed within the driving groove and has an electric charge; a first electrode which is disposed on the first surface of the barrier wall; and a second electrode which is disposed on the second surface of the barrier wall, wherein a color of a surface of the reflecting member is white.

According to anther aspect of the present invention, there is provided an electric-field-driving reflective display apparatus comprising: a barrier wall which has a plurality of driving grooves and first and second surfaces; a reflecting member which is disposed within the driving groove and has an electric charge; a first electrode which is disposed on the first surface of the barrier wall; and a second electrode which is disposed on the second surface of the barrier wall, wherein a surface of the reflecting member is coated with a color selected among red, green, and blue.

In the above aspects of the present invention, areas of cross sections of each driving groove parallel to the first and second surface are equal to each other, and the driving groove is a cylindrical groove.

In addition, the driving groove is filled with at least one of an inert gas, nitrogen, and a dry air, or the driving groove is maintained in a vacuum state.

In addition, the reflecting member may have a shape of sphere, and a diameter of the reflecting member may be smaller than that of the driving groove.

In addition, the electric-field-driving reflective display apparatus may further comprise: a first insulating layer disposed between the first surface of the barrier wall and the first electrode; and a second insulating layer disposed between the second surface of the barrier wall and the second electrode.

In addition, a plurality of the first electrodes may be disposed, the second electrode is formed as a single electrode corresponding to all the first electrodes, and the electric-field-driving reflective display apparatus may further comprise switching devices which are disposed on the first surface of the barrier wall and connected to the first electrodes to control voltages applied to the first electrodes.

In addition, the switching devices may be thin film transistors.

In addition, a color of the barrier wall may be black, and the barrier wall may be formed by performing an exposing process using a photosensitive film including a black colorant as a mask and a developing process.

In addition, the electric-field-driving reflective display apparatus may further comprise a light blocking layer disposed on one of the first and second surfaces of the barrier wall.

In addition, the electric-field-driving reflective display apparatus may further comprise an insulating substrate disposed on one of outer surfaces of the first and second electrodes.

In addition, the insulating substrate may include first and second substrates which are disposed on the outer surfaces of the first and second electrodes, respectively.

In addition, one of the first electrodes may overlap with a plurality of the grooves.

In addition, the second electrode may be made of a transparent conductive material. In addition, the second electrode may be made of ITO or IZO.

In addition, the first and second electrodes may be formed in stripe, and the first and second electrodes may intersect each other.

In addition, the driving groove may be formed to have a bottom in the barrier wall.

In addition, a grayscale may be represented by adjusting a time interval when the reflecting member reflects light.

In addition, the time interval when the reflecting member reflects light may be adjusted by intermittently and repetitively applying a voltage between the first and second electrodes.

In addition, a grayscale may be represented by adjusting a position of the reflecting member in the driving groove by changing an intensity of a voltage applied between the first and second electrodes.

Advantageous Effects

In an electric-field-driving reflective display apparatus according the present invention, since positions of white, red, green, and blue reflecting members are adjusting by using an electric force, an amount of light externally entering the reflecting member and being reflected on the reflecting members can be controlled, so that a desired image can be displayed.

BRIEF DESCRIPTION OF THE DRAWINGS

The above and other features and advantages of the present invention will become more apparent by describing in detail exemplary embodiments thereof with reference to the attached drawings in which.

MODE FOR THE INVENTION

Now, preferred embodiments of the present invention will be described with reference to the accompanying drawings.

In the drawings, thicknesses are enlarged for the purpose of clearly illustrating layers and areas. In addition, like elements are denoted by like reference numerals in the whole specification. If it is mentioned that a layer, a film, an area, or a plate is placed on a different element, it includes a case that the layer, film, area, or plate is placed right on the different element, as well as a case that another element is disposed therebetween. On the contrary, if it is mentioned that one element is placed right on another element, it means that no element is disposed therebetween.

Figure 1:
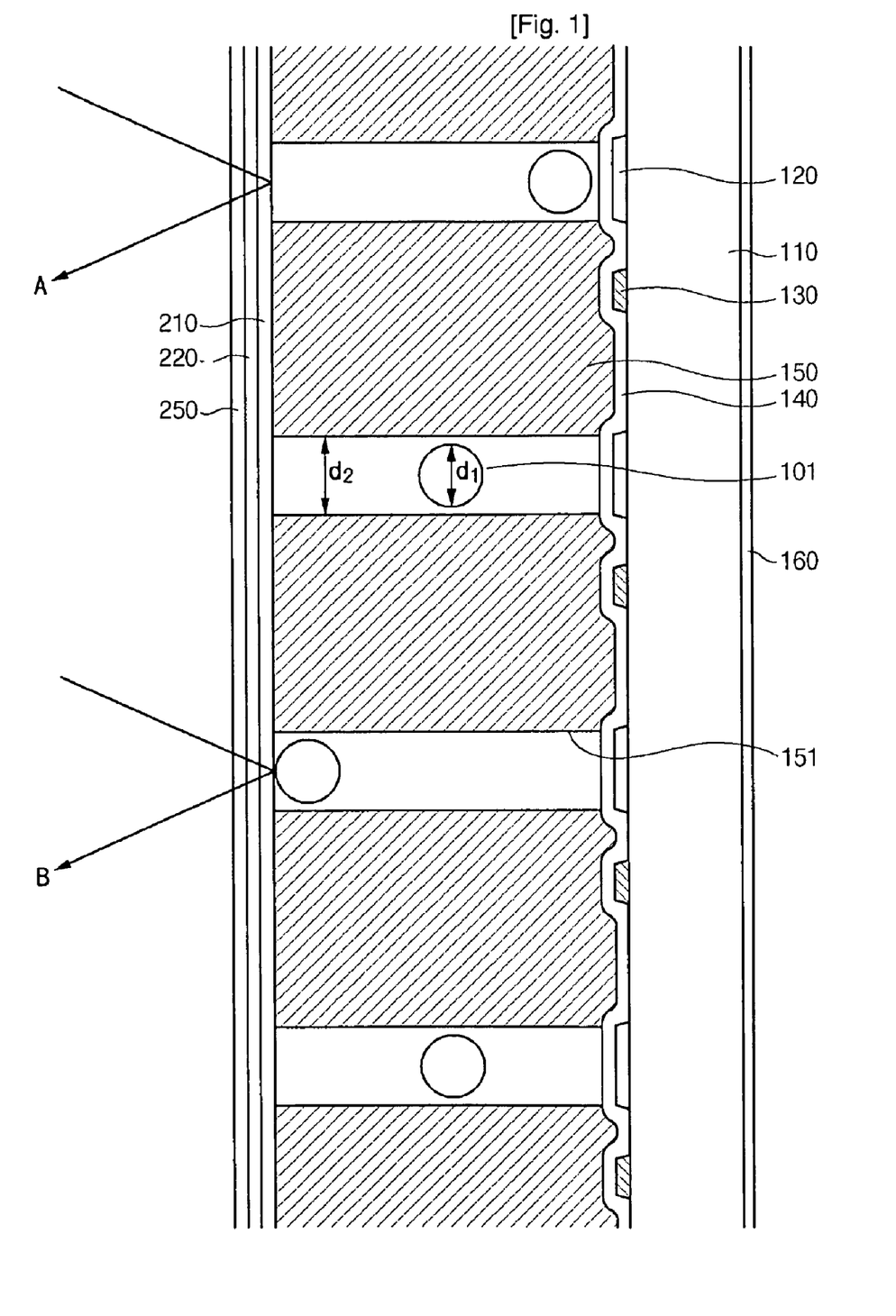
FIG. 1 is a cross sectional view showing an electric-field-driving reflective display apparatus according to an embodiment of the present invention.

FIG. 1 is a cross sectional view showing an electric-field-driving reflective display apparatus according to an embodiment of the present invention.

Referring to FIG. 1, the electric-field-driving reflective display apparatus according to the embodiment of the present invention, as an apparatus for displaying an image by adjusting an amount of light, includes a plurality of driving grooves 151 and reflecting members 101 which are disposed within the driving grooves 151 and have electric charges. A surface of each reflecting member 151 is coated in white.

An electric force is exerted on the reflecting member 1001 to move the reflecting member 101, so that an amount of light A and B externally entering the driving grooves 151 and being reflected on the reflecting members 101 is adjusted to display a desired image.

Now, a construction and operations of the electric-field-driving reflective display apparatus according to the embodiment of the present invention will be described in detail with reference to FIG. 1.

A plurality of pixel electrodes 120 are disposed on one surface of a transparent insulating substrate 110 made of a glass material or the like. The pixel electrodes 120 are made of a metal material such as chromium (Cr) and aluminum (Al) or a transparent conductive material such as indium tin oxide (ITO) and indium zinc oxide (IZO). The pixel electrodes 120 are arrayed in matrix or other regular patterns.

Switching devices 130 for individually switching the voltages applied to the pixel electrodes 120 are disposed on the insulating substrate 110. The switching devices 130 are connected to the pixel electrodes 120. The switching devices 130 may be thin film transistors. Gate lines (not shown) for transmitting scan signals to turn on and off the thin film transistors and data lines (not shown) for transmitting grayscale voltages applied to the pixel electrode 120 may be disposed to intersect each other on the insulating substrate 110.

A first insulating layer 140 is disposed on the pixel electrodes 120 and the switching devices 130. The first insulating layer 140 may be made of an inorganic insulating material such as silicon nitride SiNx or silicon oxide SiOx or an organic insulating material such as resin. In addition, the first insulating layer 140 may be disposed under the switching devices 130.

A barrier wall 150 in which a plurality of driving grooves 151 are formed is disposed on the first insulating layer 140. The barrier wall 150 may be made of a transmitting material of transmitting light or an opaque material of not transmitting light. Preferably, the barrier wall 150 is made of a black material so that unnecessary light cannot pass through the barrier wall 150 or be reflected on the barrier wall 150 in order to prevent deterioration in display quality. The barrier wall 150 may be formed by performing an exposing process using a photosensitive film including a black colorant as a mask and a developing process or a nano printing method.

Alternatively, the barrier wall 150 may be formed by performing an exposing process using a photosensitive film as a mask and a developing process, and after that, a post process may be performed not to allow light to pass through the barrier wall 150.

Each driving groove 150 has a shape of cylinder. Areas of cross sections of each driving groove 151 parallel to the first and second surface of the barrier wall are equal to each other. Each reflecting member 101 is disposed within each driving groove 151 of the barrier wall 150, and the driving groove 101 is filled with an insert gas such as helium and neon. As described above, the reflecting member 101 is made of an opaque material and has a surface coated in white, so that light reflected on the reflecting member 101 can represent a white color. In addition, as described above, the reflecting member 101 has an electric charge. The electric charge may be a positive or negative charge. Instead of the inert gas, the driving grooves 151 may be filled with nitrogen, dry air, or other gases suitable for maintaining the electric charges of the reflecting members 101. Alternatively, the driving grooves may be maintained in a vacuum state. In the embodiment, the reflecting members 101 have a shape of sphere. Alternatively, the reflecting member 101 may have a shape of cylinder or other shapes according to the shape of the driving groove 151. Preferably, a diameter d1 of the reflecting member 101 is smaller than a diameter d2 of the driving groove 151. By doing so, the reflecting member 101 can move within the driving groove without a large friction. The reflecting member 101 may be formed to have a cavity in order to reduce a weight thereof.

Referring to FIG. 1, a second insulating layer 210 is disposed on a left surface of the barrier wall. The second insulating layer 210 may be formed in a shape of film. In addition, the second insulating layer 210 may also be made of silicon nitride or silicon oxide.

A common electrode 220 made of a transparent conductive material such as ITO and IZO is disposed on the second insulating layer 210.

A light blocking layer (not shown) for partitioning pixel regions may be disposed on the common electrode 220 at positions corresponding to the barrier wall 150 in order to prevent cross-talk of light between adjacent pixels. In a case where the barrier wall 150 has a function as a light blocking layer, the light blocking layer may be omitted.

Protective films 160 and 250 are disposed on outer sides of the insulating substrate 110 and the common electrode 220, respectively, in order to protect the display apparatus according to the present invention from external impact or extraneous materials.

Now, operations of the electric-field-driving reflective display apparatus will be described.

When a voltage is applied between the pixel electrode 120 and the common electrode 220, an electric field is generated therebetween, so that the electrically-charged white reflecting member 101 moves along the driving groove 151 under the electric field. The electric field exerted on the reflecting member 101 can be controlled by adjusting the voltage between the pixel electrode 120 and the common electrode 220, so that the position of the reflecting member 101 can be adjusted.

As the position of the reflecting member 101 changes, an amount of light entering the driving groove 151 and being reflected on the reflecting member 101 changes.

As shown in FIG. 1, when the white reflecting member 101 is located to be close to the common electrode 220, externally entering light B is entirely reflected by the white reflecting member 101, white is represented. When the white reflecting member 101 is located to be close to the pixel electrode 220, externally entering light A is not reflected by the white reflecting member 101, black is represented.

Therefore, by adjusting the voltage between the pixel electrode 120 and the common electrode 220, the position of the white reflecting member 101 can be adjusted, so that an amount of the reflected light can be controlled.

Although an amount of the reflected light is controlled by adjusting the position of the reflecting member 101 within the driving groove 151, an amount of the reflected light can be controlled by adjusting a reflecting time interval when the reflecting member 100 reflects light. Now, the scheme of controlling the reflecting light will be described in detail.

A time interval when a single pixel continuously displays specific image information is defined as a frame. An amount of light can be controlled by changing a time interval when the white reflecting member 101 reflects the light in one frame. For example, when the reflecting member 101 is located at a reflecting position where the reflecting member 101 is close to the common electrode 220 (in some examples, the reflecting position may be a position where the reflecting member 101 is close to the pixel electrode 120) for the one frame, the reflecting time interval when the white reflecting member 101 reflects light is maintained for the one frame, a highest grayscale, that is, a white state, is represented. When the reflecting member 101 is located at a non-reflecting position where the reflecting member 101 is close to the pixel electrode 120 for the one frame, the non-reflecting time interval when then the reflecting member 101 does not reflect light is maintained for the one frame, a lowest grayscale, that is, a black state, is represented. When the reflecting member 101 is located at the reflecting position for a half of the one frame, an intermediate grayscale is represented. In order to control a grayscale, the reflecting member 101 may be located at the reflecting position continuously for a time interval corresponding to the grayscale. Alternatively, in order to control the grayscale, the reflecting member 101 may be reciprocally moved between the reflecting and non-reflecting positions within the driving groove 151 by intermittently and repetitively applying a voltage and an inversion voltage to the reflecting member 101. For example, in order to represent a grayscale 156 in an electric-field-driving reflective display apparatus designed to display 256 grayscales, the one frame is divided into 256 sections, and the reflecting member 101 is located at the reflecting position continuously for a time interval corresponding to 100 sections, so that a brightness for the grayscale 156 can be obtained. Alternatively, by applying a voltage and an inversion voltage to the reflecting member 101, the reflecting member 101 is rapidly and reciprocally moved between the reflecting and non-reflecting positions, so that a sum of time intervals when the reflecting member 101 is located at the reflecting position can be the time interval corresponding to the 100 sections in order to obtain the brightness for the grayscale 156.

The reflecting member 101 has a size of several micrometers to several tens of micrometers. Therefore, the reflecting member 101 can be rapidly moved with a driving voltage of several tens of mili-volts (mV) to several volts, so that it is possible to implement a display apparatus having a high operating speed and a high accuracy. Since the operating speed of the reflecting member 101 is reversely proportional to a weight thereof, the reflecting member 101 may be formed to have a cavity in order to reduce the weight thereof.

On the other hand, by using reflecting members coated in red, green, and blue, a color image can be displayed. Now, an electric-field-driving reflective display apparatus capable of display a color image will be described in detail with reference to FIG. 2.

Figure 2:
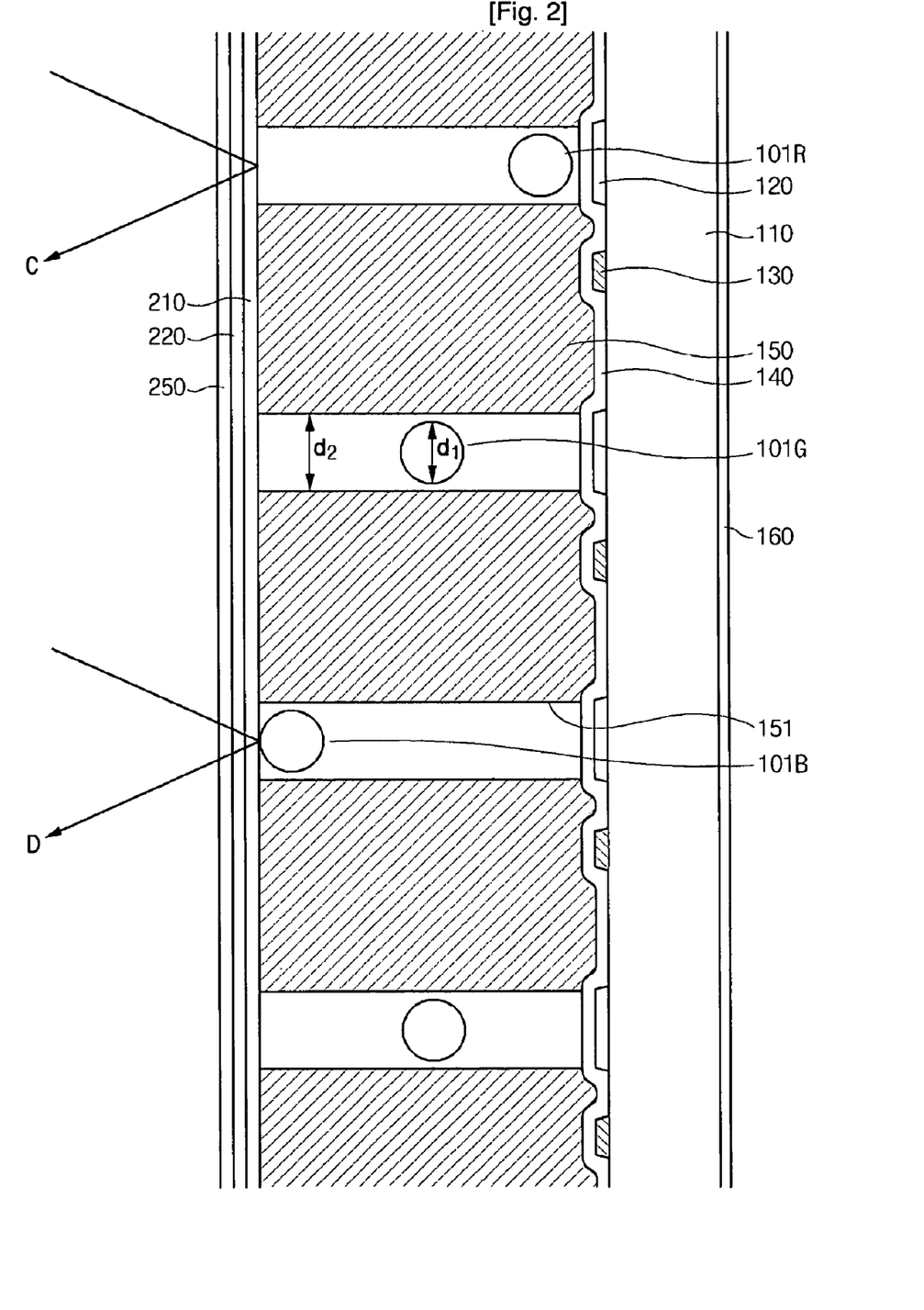
FIG. 2 is a cross sectional view showing an electric-field-driving reflective display apparatus according to another embodiment of the present invention.

FIG. 2 is a cross sectional view showing the electric-field-driving reflective display apparatus according to another embodiment of the present invention.

Referring to FIG. 2, A plurality of pixel electrodes 120 are disposed on one surface of a transparent insulating substrate 110 made of a glass material or the like. The pixel electrodes 120 are made of a metal material such as chromium (Cr) and aluminum (Al) or a transparent conductive material such as indium tin oxide (ITO) and indium zinc oxide (IZO). The pixel electrodes 120 are arrayed in matrix or other regular patterns.

Switching devices 130 for individually switching the voltages applied to the pixel electrodes 120 are disposed on the insulating substrate 110. The switching devices 130 are connected to the pixel electrodes 120. The switching devices 130 may be thin film transistors. Gate lines (not shown) for transmitting scan signals to turn on and off the thin film transistors and data lines (not shown) for transmitting grayscale voltages applied to the pixel electrode 120 may be disposed to intersect each other on the insulating substrate 110.

A first insulating layer 140 is disposed on the pixel electrodes 120 and the switching devices 130. The first insulating layer 140 may be made of an inorganic insulating material such as silicon nitride SiNx or silicon oxide SiOx or an organic insulating material such as resin. In addition, the first insulating layer 140 may be disposed under the switching devices 130.

A barrier wall 150 in which a plurality of driving grooves 151 are formed is disposed on the first insulating layer 140. The barrier wall 150 may be made of a transmitting material of transmitting light or an opaque material of not transmitting light. Preferably, the barrier wall 150 is made of a black material so that unnecessary light cannot pass through the barrier wall 150 or be reflected on the barrier wall 150 in order to prevent deterioration in display quality. The barrier wall 150 may be formed by performing an exposing process using a photosensitive film including a black colorant as a mask and a developing process or a nano printing method. Alternatively, the barrier wall 150 may be formed by performing an exposing process using a photosensitive film as a mask and a developing process, and after that, a post process may be performed not to allow light to pass through the barrier wall 150.

Each driving groove 150 has a shape of cylinder. Areas of cross sections of each driving groove 151 parallel to the first and second surface of the barrier wall are equal to each other.

Each of reflecting members 101R, 101G, and 101B is disposed within each driving groove 151 of the barrier wall 150, and the driving groove 101 is filled with an insert gas such as helium and neon. As described above, the reflecting members 101R, 101G, and 101B are made of an opaque material and have surfaces coated in red, green, and blue, respectively, so that light reflected on the reflecting member 101 can represent red, green, and blue colors. In addition, as described above, the reflecting members 101 have electric charges. The electric charge may be a positive or negative charge. Instead of the inert gas, the driving grooves 151 may be filled with nitrogen, dry air, or other gases suitable for maintaining the electric charges of the reflecting members 101R, 101G, and 101B. Alternatively, the driving grooves may be maintained in a vacuum state. In the embodiment, the reflecting members 101R, 101G, and 101B have a shape of sphere. Alternatively, the reflecting members 101R, 101G, and 101B may have a shape of cylinder or other shapes according to the shape of the driving groove 151. Preferably, a diameter d1 of each of the reflecting members 101R, 101G, and 101B is smaller than a diameter d2 of the driving groove 151. By doing so, the reflecting members 101R, 101G, and 101B can move within the driving groove without a large friction. The reflecting members 101R, 101G, and 101B may be formed to have a cavity in order to reduce a weight thereof.

Referring to FIG. 2, a second insulating layer 210 is disposed on a left surface of the barrier wall. The second insulating layer 210 may be formed in a shape of film. In addition, the second insulating layer 210 may also be made of silicon nitride or silicon oxide.

A light blocking layer (not shown) for partitioning pixel regions may be disposed on the common electrode 220 at positions corresponding to the barrier wall 150 in order to prevent cross-talk of light between adjacent pixels. In a case where the barrier wall 150 has a function as a light blocking layer, the light blocking layer may be omitted.

Protective films 160 and 250 are disposed on outer sides of the insulating substrate 110 and the common electrode 220, respectively, in order to protect the display apparatus according to the present invention from external impact or extraneous materials.

Now, operations of the electric-field-driving reflective display apparatus will be described.

A light blocking layer (not shown) for partitioning pixel regions may be disposed on the common electrode 220 at positions corresponding to the barrier wall 150 in order to prevent cross-talk of light between adjacent pixels. In a case where the barrier wall 150 has a function as a light blocking layer, the light blocking layer may be omitted.

When a voltage is applied between the pixel electrode 120 and the common electrode 220, an electric field is generated therebetween, so that each of the electrically-charged red, green, and blue reflecting members 101R, 101G, and 101B moves along the driving groove 151 under the electric field. The electric field exerted on the reflecting members 101R, 101G, and 101B can be controlled by adjusting the voltage between the pixel electrode 120 and the common electrode 220, so that the positions of the reflecting members 101R, 101G, and 101B can be adjusted.

As the positions of the reflecting members 101R, 101G, and 101B change, an amount of light entering the driving grooves 151 and being reflected on the reflecting members 101R, 101G, and 101B changes.

As shown in FIG. 2, since the blue reflecting member 101B is located to be close to the common electrode 220, externally entering light D is entirely reflected by the blue reflecting member 101B, a highest grayscale of blue is represented. Since the red reflecting member 101R is located at a position where the red reflecting member 101R is close to the pixel electrode 220, externally entering light C is not reflected by the red reflecting member 101R, red is not represented. Since the green reflecting member 101G is located at an intermediate position between the common electrode 220 and the pixel electrode 120, a portion of externally entering light is reflected by the green reflecting member 101G, so that an intermediate grayscale of green is represented.

Like this, by adjusting the voltage between the pixel electrode 120 and the common electrode 220, the positions of the red, green, and blue reflecting members 101R, 101G, and 101B can be adjusted, so that an amount of the reflected light can be controlled to display a color image.

In addition, similar to the white reflecting member 101, an amount of the reflected light can be controlled by individually adjusting reflecting time intervals when the red, green, and blue reflecting members 101R, 101G, and 101B reflects light.

In the above embodiment, an active-type electric-field-driving reflective display apparatus is described, but the present invention can be applied to a passive-type electric-field-driving reflective display apparatus.

FIGS. 3 to 6 are cross sectional views showing electric-field-driving reflective display apparatuses according to other embodiments of the present invention.

Figure 3:
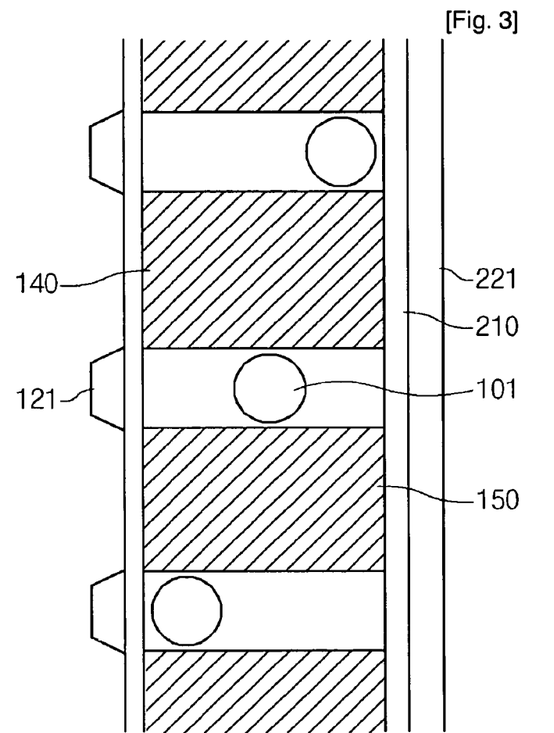
FIGS. 3 to 6 are cross sectional views showing electric-field-driving reflective display apparatuses according to still other embodiments of the present invention.

Firstly, in a passive-type electric-field-driving reflective display apparatus according to an embodiment shown in FIG. 3, first and second insulating layers 140 and 210 are disposed on two surfaces of the barrier wall 150, and first and second electrodes 121 and 221 are disposed in stripe on outer surfaces of the two insulating layers 140 and 210. Longitudinal directions of the first and second electrodes 121 and 221 are perpendicular to each other.

In the passive-type electric-field-driving reflective display apparatus, when voltages are applied to one of the first electrodes 121 and one of the second electrodes 221, a reflecting member 101 located at an intersection of the two electrodes 121 and 221 applied with the voltages is driven by an electric force.

Figure 4:
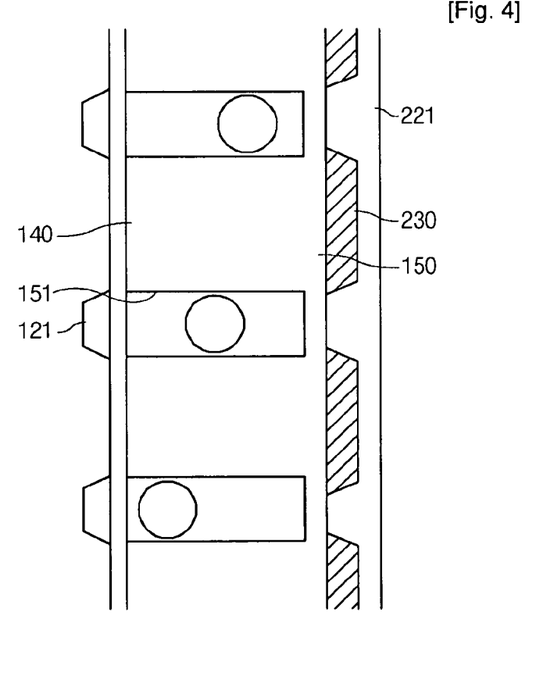

In an electric-field-driving reflective display apparatus according to an embodiment shown in FIG. 4, driving grooves 151 are formed to have a bottom so as not to pass through a barrier wall 150. A light blocking layer 230 is disposed on one side of the barrier wall 150, and second electrodes 221 are disposed on the light blocking layer 230. Since the driving grooves do not pass through the barrier wall 150, there is no need for a separate insulating layer for insulating the reflecting members 101 from the second electrodes 221. The barrier wall 150 having such a construction can be easily fabricated by using a nano printing method. In addition, since the light blocking layer 230 is formed to prevent cross-talk of light between adjacent driving grooves, the barrier wall 150 can be made of a light transmitting material.

Figure 5:
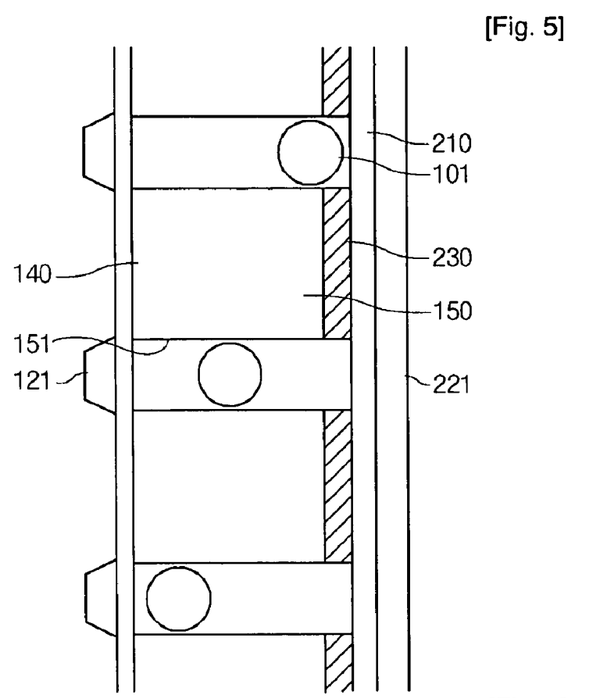

Unlike the embodiment shown in FIG. 4, in an electric-field-driving reflective display apparatus according to an embodiment shown in FIG. 5, driving grooves 151 are formed to pass through a barrier wall 150 and a light blocking layer 230, so that holes formed in the light blocking layer 230 can be used for the driving grooves 151. In addition, a second insulating layer 210 for insulating the reflecting members 101 from the second electrodes 221 is provided.

Figure 6:
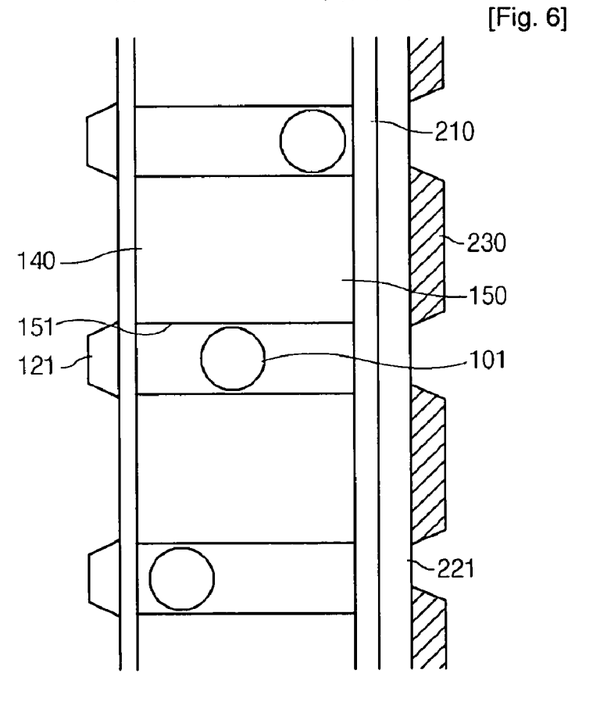

Unlike the embodiment shown in FIG. 5, in an electric-field-driving reflective display apparatus according to an embodiment shown in FIG. 6, a light blocking layer 230 is disposed on an outer surface of a second electrode 221.

In an electric-field-driving reflective display apparatus according the present invention, since positions of white, red, green, and blue reflecting members are adjusting by using an electric force, an amount of light externally entering the reflecting member and being reflected on the reflecting members can be controlled, so that a desired image can be displayed.

Although the exemplary embodiments and the modified examples of the present invention have been described, the present invention is not limited to the embodiments and examples, but may be modified in various forms without departing from the scope of the appended claims, the detailed description, and the accompanying drawings of the present invention. Therefore, it is natural that such modifications belong to the scope of the present invention.

The invention claimed is:

1. An electric-field-driving reflective display apparatus comprising:
    a barrier wall which has a plurality of driving grooves and first and second surfaces;
    a reflecting member which is disposed within the driving groove and has an electric charge;
    a first electrode which is disposed on the first surface of the barrier wall; and
    a second electrode which is disposed on the second surface of the barrier wall,
    wherein areas of cross sections of each driving groove parallel to the first and second surface are equal to each other, wherein a single reflecting member is disposed within a single driving groove.

2. The electric-field-driving reflective display apparatus of claim 1, wherein a color of a surface of the reflecting member is white.

3. The electric-field-driving reflective display apparatus of claim 1, wherein a surface of the reflecting member is coated with a color selected among red, green, and blue.

4. The electric-field-driving reflective display apparatus of claim 1, wherein the driving groove is a cylindrical groove.

5. The electric-field-driving reflective display apparatus of claim 1, wherein the reflecting member has a shape of sphere.

6. The electric-field-driving reflective display apparatus of claim 5, wherein a diameter of the reflecting member is smaller than that of the driving groove.

7. The electric-field-driving reflective display apparatus of claim 1, wherein the driving groove is filled with at least one of an inert gas, nitrogen, and a dry air.

8. The electric-field-driving reflective display apparatus of claim 1, wherein the driving groove is maintained in a vacuum state.

9. The electric-field-driving reflective display apparatus of claim 1, further comprising:
    a first insulating layer disposed between the first surface of the barrier wall and the first electrode; and
    a second insulating layer disposed between the second surface of the barrier wall and the second electrode.

10. The electric-field-driving reflective display apparatus of claim 1,
    where a plurality of the first electrodes are disposed,
    wherein the second electrode is formed as a single electrode corresponding to all the first electrodes, and
    wherein the electric-field-driving reflective display apparatus further comprises switching devices which are disposed on the first surface of the barrier wall and connected to the first electrodes to control voltages applied to the first electrodes.

11. The electric-field-driving reflective display apparatus of claim 10, wherein the switching devices are thin film transistors.

12. The electric-field-driving reflective display apparatus of claim 1, wherein a color of the barrier wall is black.

13. The electric-field-driving reflective display apparatus of claim 12, wherein the barrier wall is formed by performing an exposing process using a photosensitive film including a black colorant as a mask and a developing process.

14. The electric-field-driving reflective display apparatus of claim 1, further comprising a light blocking layer disposed on one of the first and second surfaces of the barrier wall.

15. The electric-field-driving reflective display apparatus of claim 1, further comprising an insulating substrate disposed on one of outer surfaces of the first and second electrodes.

16. The electric-field-driving reflective display apparatus of claim 15, wherein the insulating substrate includes first and second substrates which are disposed on the outer surfaces of the first and second electrodes, respectively.

17. The electric-field-driving reflective display apparatus of claim 1, wherein one of the first electrodes overlaps with a plurality of the grooves.

18. The electric-field-driving reflective display apparatus of claim 1, wherein the second electrode is made of a transparent conductive material.

19. The electric-field-driving reflective display apparatus of claim 18, wherein the second electrode is made of ITO or IZO.

20. The electric-field-driving reflective display apparatus of claim 1,
    wherein the first and second electrodes are formed in stripe, and
    wherein the first and second electrodes intersect each other.

21. The electric-field-driving reflective display apparatus of claim 1, wherein the driving groove is formed to have a bottom in the barrier wall.

22. The electric-field-driving reflective display apparatus of claim 1, wherein a grayscale is represented by adjusting a time interval when the reflecting member reflects light.

23. The electric-field-driving reflective display apparatus of claim 22, wherein the time interval when the reflecting member reflects light is adjusted by intermittently and repetitively applying a voltage between the first and second electrodes.

24. The electric-field-driving reflective display apparatus of claim 1, wherein a grayscale is represented by adjusting a position of the reflecting member in the driving groove by changing an intensity of a voltage applied between the first and second electrodes.

* * * * *